3,059,026
PROCESS FOR PURIFICATION OF THREONINE
Takashi Miyamae, Fujisawa-shi, and Masao Shimokoshi, Tokyo, Japan, assignors to Ajinomoto Co., Inc., Tokyo, Japan
No Drawing. Filed Sept. 25, 1959, Ser. No. 842,229
Claims priority, application Japan Oct. 9, 1958
9 Claims. (Cl. 260—534)

The present invention relates to a novel process of purifying threonine which can be carried out on an industrial scale.

Threonine is considered to be an important synthetic nutritional agent, but there are few commercially applicable processes for its manufacture. One process starts with glycine (M. Sato, K. Okawa and S. Akabori, Bulletin of the Chemical Society of Japan, 30, 937 (1957)), and another one uses acetoacetic acid as a raw material (K. Pfister, III, C. A. Robinson, A. C. Shabica and M. Tichler, J.A.C.S., 70, 2297 (1948), 71, 1105 (1949); Y. Izumi and S. Konishi, Nihon Kagaku Kaishi, 74, 957, (1953)). The second method produces more DL-allo-threonine than DL-threonine itself, and it is conventional to transform allo-threonine into threonine by oxazoline inversion. The yield of pure DL-threonine is low due to the poor efficiency of the oxazoline inversion and to the difficulty of seprating DL-threonine from contaminating glycine. Although the method starting with glycine gives more DL-threonine than DL-allothreonine, the ratio of the latter to the former in the crystalline product is 1:1.8 at the most, and does not rise above 1:2.4 even after repeated recrystallization.

It is also difficult to separate pure L-threonine from natural sources because of contamination with L-serine.

This invention relates to a process for purification of DL- or L-threonine, in which crude threonine is first converted to its copper salt, the copper salt of threonine is reacted with an aldehyde to form a threonine-aldehyde-copper chelate, the chelate is separated from contaminants by utilizing the solubility difference between said chelate and contaminants, and the chelate is finally decomposed to regenerate threonine. According to the present invention, very pure threonine can be obtained in a good yield.

The instant invention is based upon the discovery that the copper salt of threonine forms a stable hexacoordinated chelate in alkaline media in the presence of aldehyde. When 2 ml. of 10% aqueous sodium carbonate solution are added to an aqueous solution of 2 g. of the copper salt of DL-threonine in 20 ml. of water, then 6 g. of 35% formaldehyde solution and the mixture is shaken for a while, 1.9 g. of faintly bluish crystals are precipitated. After recrystallization from methanol, 0.8 g. of needle shaped crystals are obtained. Analysis shows: C 33.40%; H 5.56%; N 7.77%. These figures, molecular weight measurements, and infra-red spectrum prove the structure of the new chelate to be as follows:

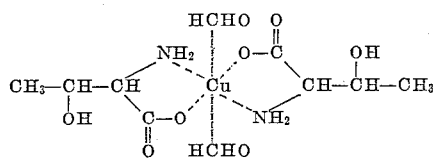

When acetaldehyde is used instead of formaldehyde in the above reaction, 0.9 g. of faintly bluish plate shaped crystals of a chelate are obtained from 2 g. of copper salt of the DL-threonine. Analysis shows C 37.16%; H 6.30%; N 7.34% and the structure is found to be as follows:

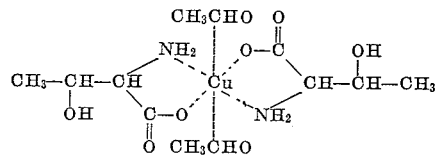

With monochloroacetaldehyde, propionaldehyde and the like, similar facts have been observed, leading to corresponding chelates.

The reaction proceeds smoothly at room temperature. However, the solution may be warmed at a temperature preferably not higher than about 50° C.

The aldehyde is to be used preferably in stoichiometric amounts and not more, because excess aldehyde acts as an organic solvent which dissolves the chelate and reduces the yield.

Sodium carbonate in the above-mentioned reaction serves to accelerate the precipitation of chelate and as a stabilizer for the chelate formed. However, the addition reaction with aldehyde proceeds even if sodium carbonate is not added. Other alkalies such as potassium carbonate, sodium hydroxide, potassium hydroxide, or the like may be used instead of sodium carbonate. Ammonia is not recommended since an excess decomposes the chelates.

The chelates of threonine-aldehyde-copper are only sparingly soluble in water but readily soluble in organic solvents such as aldehyde. They resist heat and no appreciable decomposition occurs at 110° C., under 14 mm. Hg in 2 days. The chelates react with acids, hydrogen sulfide, and ammonia to release aldehyde and copper. Threonine is regenerated quantitatively.

Having prepared chelates of various aldehydes with the copper salts of DL-threonine, DL-allothreonine and L-threonine and investigated their properties, we have found that the solubility in water of the acetaldehyde-copper chelate of DL-allothreonine is twice that of the acetaldehyde-copper chelate of DL-threonine and the rate of precipitation of the latter is substantially greater than that of the former. These differences in physical properties are even greater in the formaldehyde chelates, so that the solubility differences of the aldehyde chelates may be utilized for separation of threonine from allothreonine to obtain the former in a state of high purity and in a good yield. It is equally possible to separate L-threonine from L-serine as the aldehyde-copper chelates.

The differences between the solubilities of threonine-aldehyde-copper chelates and those of allothreonine-aldehyde-copper chelates, have been found sufficient as shown in Table 1, to permit separation of threonine from allothreonine which is the main contaminant of crude threonine.

TABLE 1

| Chelates: | Solubilities (g. in 100 g. water) |
|---|---|
| DL-Threonine-acetaldehyde-copper | 0.58 (24° C.) |
| DL-Allothreonine-acetaldehyde-copper | 1.00 (24° C.) |
| DL-Threonine-formaldehyde-copper | 0.19 (28° C.) |
| DL-Allothreonine-formaldehyde-copper | 0.40 (28° C.) |

Free threonine is recovered from the chelate when the later is decomposed with acids, hydrogen sulfide or the like. Removal of copper may be accomplished by conventional means. For instance, when the solution is passed through a column of a strongly acidic ion exchange resin, copper and threonine are adsorbed. When ammonia water is then passed through the column, threonine is eluted.

According to the present invention, pure threonine may be prepared also from glycine. When 1 mole of glycine is converted to its copper salt and 2 moles of acetaldehyde, are added threonine and allothreonine are formed in a ratio of approximately 2:1. If 4 moles of acetaldehyde are added instead of 2 moles to said copper salt of glycine, threonine- and allothreonine-acetaldehyde-copper chelates are produced. The chelates may be separated in accordance with the present invention.

Other features of this invention will become apparent from the following illustrative examples of the process of the invention.

Example 1

117.4 grams of DL-threonine prepared from acetoacetic acid ester and containing 85.5 g. of DL-threonine, 21.4 g. of allothreonine and 7.5 g. of glycine, are dissolved in 1 l. of water. Cupric oxide prepared from 125 g. of cupric sulfate is added to form a solution of the copper salt of DL-threonine. Immediately after dissolving 12 g. of sodium hydroxide in said solution, 80 ml. of acetaldehyde are added drop by drop under stirring. DL-threonine-acetaldehyde-copper chelate crystals are precipitated. They are filtered off and washed. The chelate is decomposed in an aqueous solution adjusted to pH2 with 3 N sulfuric acid and the solution is passed through a column of Diaion SK #1 (a trademark for a strongly acidic ion-exchange resin prepared by Mitsubishi Chemical Industry Ltd.) to adsorb DL-threonine and copper. After washing with water, the adsorbed threonine is eluted from the resin with 2 N aqueous ammonia. The eluate is evaporated in vacuo and the residue is recrystallized from aqueous methanol. 63 g. of DL-threonine of 99.5% purity are obtained.

Example 2

150 ml. of acetaldehyde are added to a mixture of 400 ml. of water, 115 g. of copper glycinate, and 12 g. of sodium hydroxide, over a period of 7 minutes under stirring at 50° C. The DL-threonine-acetaldehyde-copper chelate crystals which appear in about 45 minutes are filtered off. After decomposition and recrystallization in the same way as described in Example 1, 39 g. of DL-threonine of 99.8% purity are obtained.

Example 3

119 grams of crude DL-threonine containing 72 g. of DL-threonine and 47 g. of DL-allothreonine, are dissolved in 1 l. of water and cupric oxide, prepared from 125 g. of cupric sulfate, is added to the solution so as to form the copper salt of DL-threonine. To the solution formed, 20 g. of sodium carbonate and 200 ml. of 35% formaldehyde solution are added. Crystals of DL-threonine-formaldehyde-copper chelate precipitated. After decomposition and recrystallization of the chelate crystals as described in Example 1, 35 g. of DL-threonine of 99.5% purity were obtained.

Example 4

A solution of 300 ml. of water and 100 g. of crude L-threonine, containing 50% L-serine, is combined with cupric oxide prepared from 125 g. of cupric sulfate. After 200 ml. of 35% formeldehyde solution are added to said solution, the reaction mixture is kept for 10 days in a cold room. The crystals formed are treated as described in Example 1, and 22 g. of L-threonine are obtained.

We claim:

1. A process for purifying threonine contaminated with another amino acid selected from the group consisting of allothreonine, glycine, and serine, which comprises:

(a) reacting said contaminated threonine with cupric oxide and a lower aliphatic aldehyde selected from the group consisting of formaldehyde, acetaldehyde, propionaldehyde, and monochloroacetaldehyde to form the aldehyde-copper chelates of threonine and of said other amino acid;

(b) separating said chelates by differential crystallization; and (c) decomposing the separated threonine chelate to recover purified threonine.

2. A process as set forth in claim 1, wherein the amount of said aldehyde is not more than substantially equimolecular to the combined amounts of said threonine and of said other amino acid.

3. A process as set forth in claim 1, wherein said contaminated threonine is reacted with said cupric oxide and said aldehyde in an aqueous medium, and said chelates are separated by differential crystallization from said aqueous medium.

4. A process as set forth in claim 3, wherein said aqueous medium is alkaline.

5. A process for the purification of crude threonine essentially consisting of threonine and at least one contaminant selected from the group consisting of glycine, allothreonine, and serine, which comprises the steps of reacting the copper salts of said threonine and of said contaminant in aqueous solution with a lower aliphatic aldehyde selected from the group consisting of formaldehyde, acetaldehyde, propionaldehyde, and monochloroacetaldehyde, whereby a copper chelate of threonine is preferentially precipitated; separating said precipitated chelate from the remainder of said solution; and decomposing the separated chelate into the constituents thereof to recover purified threonine.

6. A process as set forth in claim 5, wherein said aldehyde is formaldehyde.

7. A process as set forth in claim 5, wherein said aldehyde is acetaldehyde.

8. A process for preparing purified threonine, comprising the steps of reacting copper glycinate in aqueous solution with a lower aliphatic aldehyde selected from the group consisting of formaldehyde, acetaldehyde, propionaldehyde, and monochloroacetaldehyde whereby the aldehyde copper chelates of threonine and allothreonines are formed; permitting the chelate of threonine to precipitate from said solution; separating the precipitated threonine chelate from the remainder of said solution; and decomposing the precipitated chelate to recover purified threonine.

9. A process as set forth in claim 8, wherein substantially four moles of said aldehyde are reacted with one mole of said glycinate.

References Cited in the file of this patent

UNITED STATES PATENTS 2,831,763    Nashner _____ Apr. 22, 1958

OTHER REFERENCES

Mukherjie et al.: Journal of the Indian Chemical Society (1955), vol. 32, pages 581–588. (Abstracted in Chemical Abstracts, vol. 50, page 11,973.)

Finar: "Organic Chemistry" (1959), vol. 1, page 390.

Bailar: "Chemistry of the Coordination Compounds" (1956), page 37.

Martell et al.: "Chemistry of the Metal Chelate Compounds" (1952), page 26.

(Copies of above in Scientific Library.)